Figure 1:
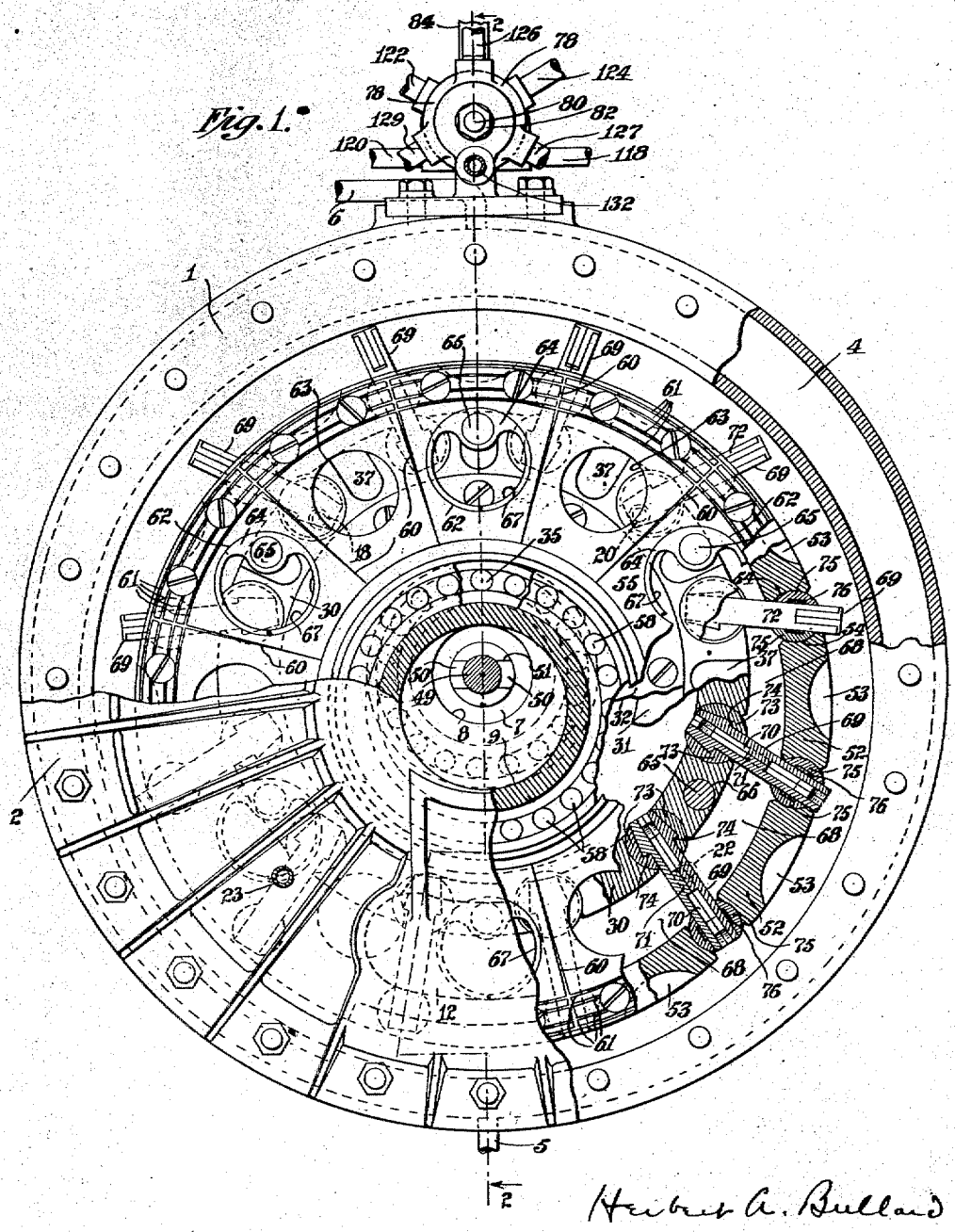

June 18, 1929. H. A. BULLARD Re. 17,326

INTERNAL COMBUSTION ENGINE

Original Filed Aug. 2, 1919 3 Sheets-Sheet 1

Herbert A. Bullard

INVENTOR

WITNESSES

E. D. Mitchell

BY Wm. B. Whiting

ATTORNEY

June 18, 1929. H. A. BULLARD Re. 17,326
INTERNAL COMBUSTION ENGINE
Original Filed Aug. 2, 1919 3 Sheets-Sheet 2
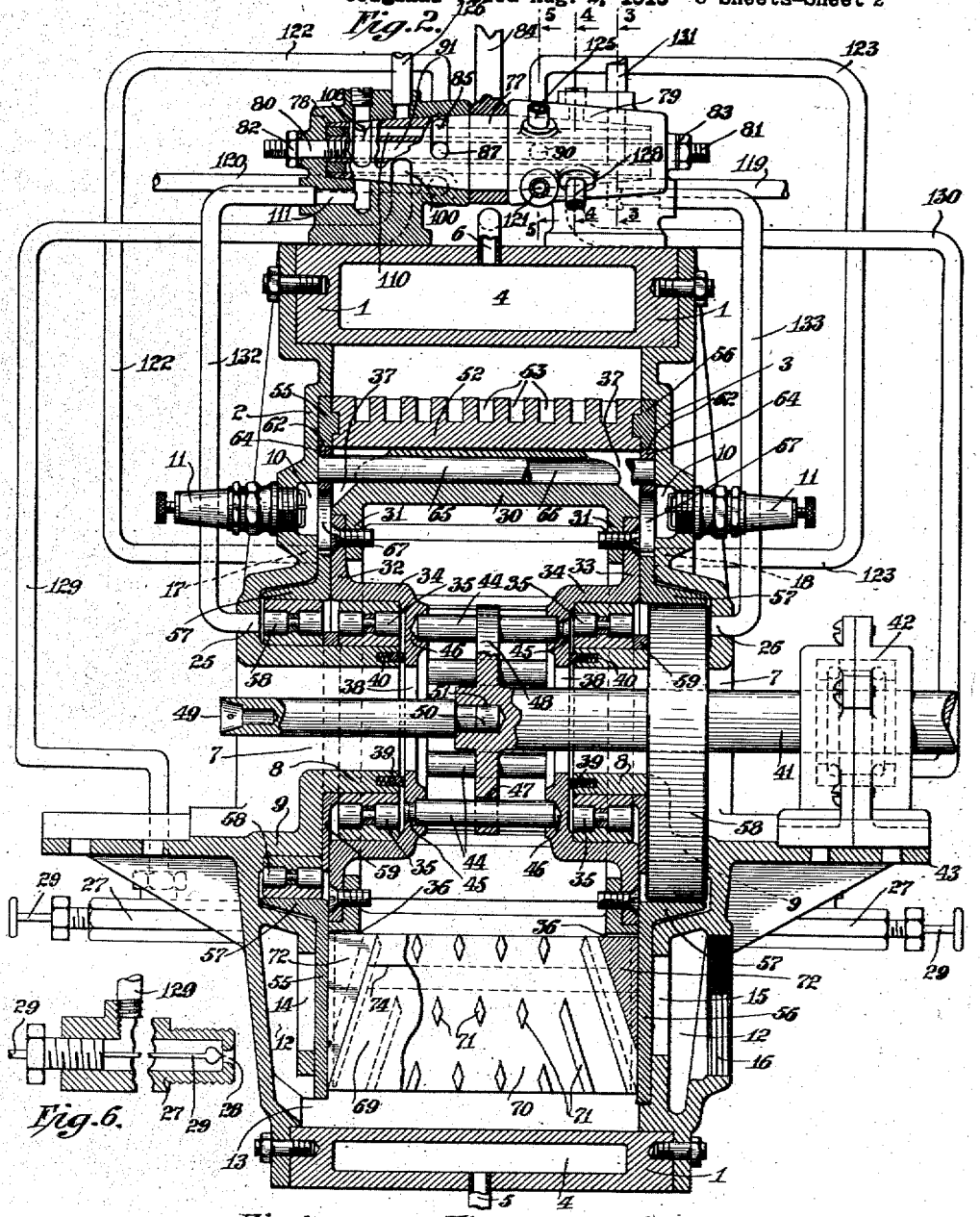
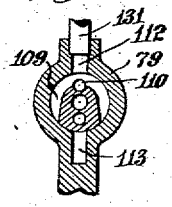
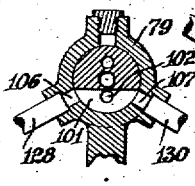
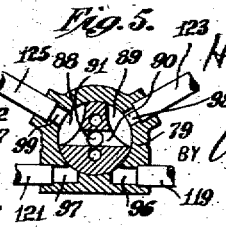
WITNESSES
J. McNeher
Herbert A. Bullard
INVENTOR
BY Wm. B. Whitney
ATTORNEY June 18, 1929. H. A. BULLARD Re. 17,326

INTERNAL COMBUSTION ENGINE

Original Filed Aug. 2, 1919 3 Sheets-Sheet 3

WITNESSES

Herbert A. Bullard
INVENTOR

BY Wm. B. Whitney
ATTORNEY

Reissued June 18, 1929. Re. 17,326

UNITED STATES PATENT OFFICE.

HERBERT A. BULLARD, OF SYRACUSE, NEW YORK, ASSIGNOR, BY MESNE ASSIGNMENTS, TO ROTARY MOTORS COMPANY, A CORPORATION OF DELAWARE.

INTERNAL-COMBUSTION ENGINE.

Original No. 1,618,806, dated February 22, 1927, Serial No. 314,882, filed August 2, 1919. Application for reissue filed February 21, 1929. Serial No. 341,856.

My present invention relates to an internal combustion engine, of rotary type, in which a liquid or gaseous fuel is first compressed and then fired and exploded to do its work without the use of reciprocating parts; and the object of the invention is to provide a rotary engine which, by the elimination of many of the troublesome parts and accessories essential to the engine of this class now in commercial use, is simple in its construction and operation and which by reason of its high efficiency permits of a considerable reduction in weight per horse power developed.

With this end in view, my new rotary engine comprises, as one of its features, two rotors which are mounted eccentrically one within the other and operatively connected to rotate together and a plurality of radially disposed vanes which are mounted in the rims of the rotors by hinge joints permitting a sliding movement of the vanes through the rim of one or both of the rotors and which subdivide the enclosed crescent-shaped space formed between the rotors into a series of contracting and expanding explosion chambers. These rotary parts may be conveniently mounted in a cylindrical casing, the inner rotor preferably concentric with and the outer rotor consequently eccentric to the casing, which thus forms between its walls and the outer rotor an enclosed crescent-shaped space oppositely disposed to that formed between the two rotors, into which the outer ends of the vanes extend, and which provides in its heads suitable inlet and exhaust ports for the explosion chambers. I thus obtain a well-balanced engine and auxiliary fan, in which sliding frictional contact between the parts is almost entirely eliminated and which, with running clearances of from three to five-thousandths of an inch, is free running, lends itself to easy and complete lubrication, and reduces loss by leakage back or slip to a minimum since such leakage as takes place is from one to an adjoining chamber where it still does useful work; and by spraying the fuel into the explosion chambers through a needle valve or other suitable injector at a point in their revolution where they are filled with air under little more than atmospheric pressure I am able to dispense with the usual carburetor, while no muffler is required since the products of combustion are exhausted from the explosion chamber after being expanded therein to substantially atmospheric pressure.

As another feature, I provide a tank filled with air or other inert gas under pressure which is so connected through a suitable valve with the engine and with the fuel and oil supply that, under the control of this single valve, the engine can be started in either direction and is supplied both with fuel and oil under pressure of gas from the tank which is kept filled at a pressure automatically restored and maintained by the operation of the engine, thus providing a self-starting reversible engine which is operated entirely without the use of extraneous pumps.

A third feature consists in a novel air-cooling and scavenging system by which air drawn in through the heads of the casing to the center of the inner rotor is forced outwardly through the hollow vanes into the closed space between the outer rotor and the casing where it is further compressed by the vanes and utilized to scavenge the explosion chambers successively at the point of exhaust.

Still another feature is provided by a construction which at the proper moment in their revolution allows a flash-back of the fuel charge exploded in one chamber into the next succeeding chamber to ignite the charge therein, thus requiring the use of a spark plug, one which can be operated by a dry battery or by a plain magneto without commutator, only for starting the engine.

The invention also embraces the other novel features of form, arrangement, and combination of parts hereinafter described and more particularly pointed out in the appended claims.

The invention will be understood by reference to the accompanying drawings wherein is shown by way of illustration, an engine embodying all of the different features mentioned, and in which—

Figure 7:
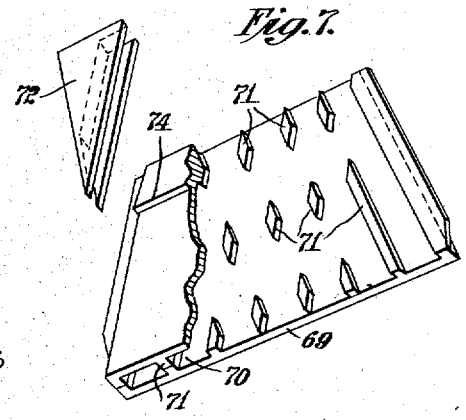

Figure 1 is a view of the engine in front elevation, with parts broken away to show the interior partly in elevation and partly in section; Fig. 2 a section on the broken line 2—2 of Fig. 1; Figs. 3, 4, and 5, sectional details of the control valve on the lines 3 3, 4 4, and 5 5 of Fig. 2, respectively, showing the valve closed; Fig. 6, a broken detail, in longitudinal section of the needle valve employed as an injector at each of the four fuel inlet ports; Fig. 7, a perspective view of one of the vanes, partly broken away, and of one of its two wedge-shaped packings, and Fig. 8, a diagrammatic view of the pressure, fuel, and oil tanks and of their connection with each other and with the engine, shown in perspective from the back, showing the connections through the control valve as they are when the valve is turned to open position to start and run the engine in a counter clock-wise direction, viewed from the front of the engine.

The same reference characters indicate like parts throughout the several figures.

Referring to the drawings, the engine casing, which is to be supported in any suitable manner, consists of an annular rim 1 and front and rear head plates 2 and 3. The rim is hollow and the annular chamber 4 is formed therein, provided as here shown with lower water inlet 5 and upper water outlet 6, serves as a water jacket, although it may be used, if found desirable, as the pressure storage tank to which reference is hereinafter made; and each of the two head plates bolted or otherwise secured to the rim, is offset centrally to form an inwardly projecting sleeve or hub which provides a central air inlet 7 and an inner bearing 8, preferably concentric or substantially concentric with the casing, and an outer bearing 9 eccentric both to the inner bearing and to the casing. The casing also has, formed in each, head, an inwardly open ignition chamber or recess 10, above the hub, into the wall of which is set spark plug 11, and, below the hub, a chamber 12 which in the front head is an air-chamber and is provided with horizontally elongated inlet 13 and outlet 14 and in the rear head is an exhaust chamber having a horizontally elongated inlet 15, and circular threaded outlet 16 for an exhaust pipe. The casing is further provided, front and rear, with left pressure inlet ports 17 and 18 and right pressure inlet ports 19 and 20, with right fuel inlet ports 21 and 22 and left fuel inlet ports 23 and 24, and lubricant inlet ports 25 and 26; and each of the fuel inlet ports is equipped with an injector or spraying device which, as shown, is an ordinary needle valve comprising a hollow plug 27, with contracted orifice 28 controlled by an adjustable needle 29, and is screwed into the inlet port.

The inner rotor of the engine, made up of a ring 30, with integral flanges 31 projecting inwardly therefrom on either side, and of two annular plates 32 and 33, both alike, which are set into annular recesses in the outer faces of the flanges and are there secured in place by screws or otherwise and are offset inwardly to provide hubs 34, is mounted to rotate, on suitable roller or other bearings 35, upon the inner hub bearings 8 of the casing. It has, around its periphery, a series of transverse cylindrical sockets 36, which separate the ring proper between the two flanges into sections and provide seats for the hinge joints of the vanes, and, both front and rear, an intermediate series of radial round-bottomed grooves 37 which are inclined so as to form prongs from the sides to the periphery of the rotor and serve a purpose to be hereinafter described. It is packed, around the central openings 38 in its ends which register with the air inlet openings in the heads of the casing by packing rings 39 which are spring-mounted in grooves 40 provided for the purpose in the ends of the casing hubs and bear against the outer surface of the front and rear plates.

This rotor is connected with the main engine shaft 41 journaled in a suitable thrust bearing 42 mounted on a bracket 43 on the back of the casing, by means of rods 44 which for convenience of manufacture are riveted at one end in openings 45 alternately in the other of the two plates and at the other end fit into sockets 46 in the opposite plate and which pass through openings 47 provided therefor in a flange 48 on the end of the shaft, the flange sliding freely upon the rods so as to take up any end thrust on the shaft without transmitting it to the engine. A magneto drive shaft 49 is shown as keyed to the main shaft by oppositely projecting lugs 50 on its reduced end which fits into a correspondingly shaped socket 51 in the end of the shaft.

The outer rotor consists of a series of ring sections 52 which are longitudinally grooved at 53 to increase their radiating surface and form between adjoining sections, a series of transverse cylindrical sockets 54 corresponding in number and angular position to the similar sockets in the periphery of the inner rotor, and of two like annular plates 55 and 56 which are secured to the ring sections by screws and hold them in place and are offset outwardly around their inner edges to provide hubs 57 by which this rotor is mounted, with roller bearings 58 separated by washers 59 from the similar bearings of the inner rotor, upon the outer bearings 9 on the casing hubs. Each plate has intersecting radial and circumferentail oil grooves 60 and 61 in its outer surface and a circular series of round openings 62 alternating with similar but smaller openings 63 which, front and rear, register with the ignition chambers, the pressure, fuel, and lubricant inlet ports, and the outlet from the air chamber and the inlet to the exhaust chamber in the heads of the casing.

The two rotors are operatively connected, so as to rotate synchronously about their eccentric axes, by means of skeleton split disks 64 which turn within the larger openings 62 in the sides of the outer rotor and upon the ends of studs 65 passing through holes 66 extending across the rim of the inner rotor, the kidney-shaped openings 67 in the disk providing passages of substantially the same area as those provided by the smaller openings 63; and the crescent-shaped chamber formed between the rims of the rotors is divided into a series of explosion chambers 68 by vanes 69, made for convenience in two sections, which, channeled to provide a narrow air-passage 70 (interrupted by supports 71) extending from inner to outer end and having wedge-shaped packing pieces 72 mounted by tongue and groove connections to slide upon inwardly tapered edges, are hinged at their inner ends to the inner rotor, by two segmental strips 73 fitting the sockets of this rotor and grooved on their inner faces to accommodate locking shoulders 74 on the vanes, and slide between plain segmental strips 75 fitted with packings 76 and rocking in the sockets of the outer rotor.

The control valve, which is shown as mounted upon the top of the engine casing but may be located wherever found convenient, consists of a double plug 77 and of two thimbles 78 and 79, provided with pedestals by which they are mounted on the casing, within the tapered walls of which the tapered ends of the plug, adjustably secured front and rear by bolts 80 and 81 set into the ends of the plug and provided with adjusting nuts 82 and 83, are rocked by a valve lever 84 secured to the plug between the two thimbles. For a double control of the pressure system of the engine, the valve plug has, both front and rear, two transverse grooves and connecting passage 85, 86, 87 and 88, 89, 90, which are connected together by a longitudinal passage 91 and which co-operate with an inlet port 92 and three outlet ports 93, 94, and 95 in the front thimble and with similar inlet and outlet ports 96, 97, 98, and 99 in the rear thimble. The fuel system is controlled through transverse grooves 100 and 101 in the front and rear portions of the plug, and these grooves, connected together by a longitudinal passage 102, co-operate respectively with an inlet port 103 and two outlet ports 104 and 105 in the front thimble and with two outlet ports 106 and 107 in the rear thimble. And the lubricating system is similarly controlled through front and rear circumferential grooves 108 and 109 in the plug, with connecting longitudinal passage 110, respectively co-operating with an elbow outlet port 111 in the front thimble and an inlet port 112 and elbow outlet port 113 in the rear thimble.

For the operation of the engine there are provided a pressure storage tank 114, a fuel tank 115, and a lubricant tank 116. The pressure storage tank is connected by pipe 117 and branch pipes 118 and 119 to the two inlet ports 92 and 96 of the control valve and through the valve to the top of the fuel tank by pipe 120 leading from the valve outlet port 93, with the top of the lubricant tank by pipe 121 leading from the valve outlet port 97, and with both the front and the back of the engine either by pipes 122 and 123 from the valve outlet ports 94 and 98 to the left pressure inlet ports 17 and 18 or by pipes 124 and 125 from the valve outlet ports 95 and 99 to the right pressure inlet ports 19 and 20. The fuel tank, connected with the pressure storage tank as described, is connected to the control valve by pipe 126, leading to the valve inlet port 103 and through the valve either with the right side of the engine by pipes 127 and 128 from the valve outlet ports 104 and 106 to the injectors in the front and rear fuel inlet ports 21 and 22 or with the left side of the engine by pipes 129 and 130 from the valve outlet ports 105 and 107 to the injectors in the front and rear fuel inlet ports 23 and 24. The lubricant tank is connected, in addition to its connection with the storage pressure tank already described, with the control valve and through it with both the front and the back of the engine by pipe 131 to the valve inlet port 112 and by pipes 132 and 133 from the valve outlet ports 111 and 113 to the two lubricant inlet ports 25 and 26.

With the control lever in central vertical position, the valve is closed and all the connections of the pressure, fuel, and lubricant tanks with each other and with the engine are cut off (see Figs. 2–5.) Upon turning the control lever to the left (as viewed from the front of the engine), the pressure tank is connected with the fuel and lubricant tanks and the three tanks are connected with the engine, the pressure tank with its left and the fuel tank with its right side (also as viewed from the front), and the engine will start to run in counter-clockwise direction. Or by turning the control lever to the right, the connections of the pressure and fuel tanks with the engine will be reversed, that is to say, will be made with the right and the left side of the engine respectively, while the connection of the pressure tank with the fuel and lubricant tanks and of the latter with the engine will be as before, and the engine will run in a clockwise direction.

Figure 8:
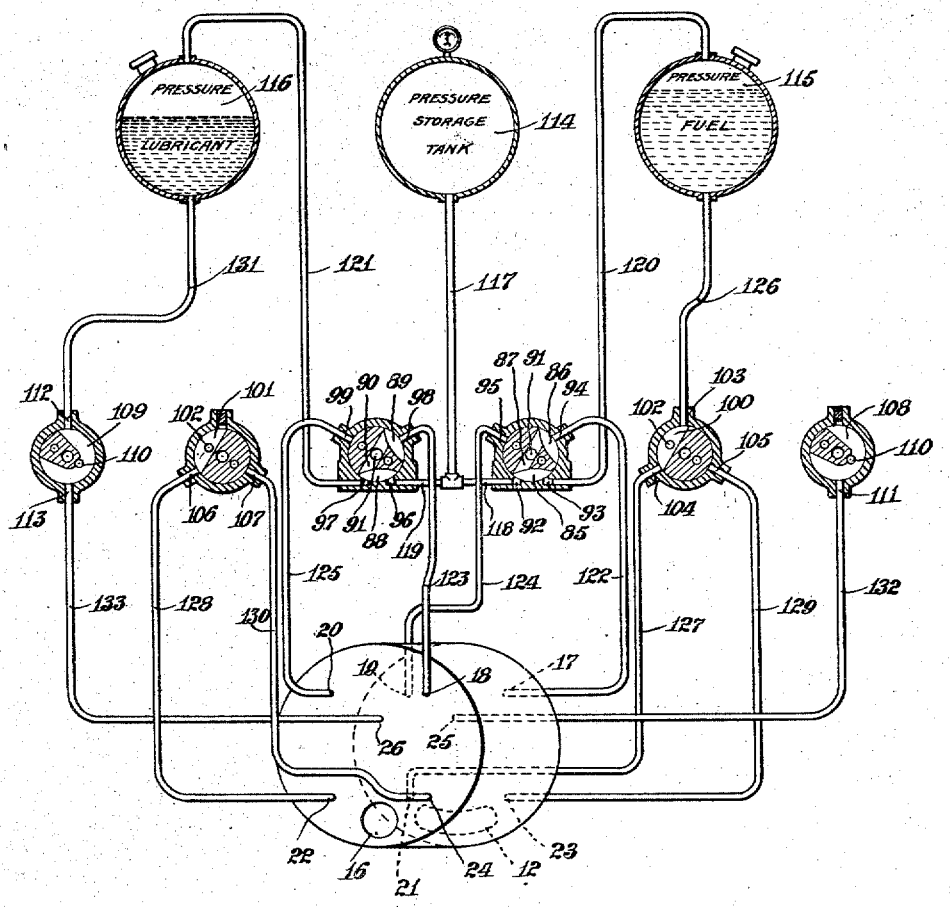

The operation of the engine, which is the same in whichever direction it is thus started, is as follows, taking for example the case where the control lever has been turned to the left and the valve plug is in the position illustrated in Fig. 8: The air or other inert gas in the pressure tank is forced to the front and rear pressure inlet ports in the left side of the engine and thence through a front and rear opening 63 (or disk in opening 62 as the case may be) in the sides of the outer rotor and radial groove 37 in the sides and periphery of the inner rotor into both ends of the explosion chamber which happens to be in register therewith and which at this point in its cycle has a relatively small area. The pressure of this air upon the walls of the explosion chamber acting upon the larger surface of the lower vane and upon the rims of the rotors, starts the engine counter-clockwise; whereupon, as the engine begins to turn, this explosion chamber passes out of, and the next and succeeding chambers pass into, register with the pressure inlet ports, and the pressure of the air thus admitted to these chambers acts in the same way as in the first and accelerates the engine. Meanwhile, the gas from the fuel tank, under pressure from the pressure tank, has been sprayed by the injectors in the front and rear fuel inlet ports on the right side of the engine through openings 63 (or disks in opening 62) into the ends of first one and then another explosion chamber at a point in its cycle where the area of the chamber is close to maximum, and, as each chamber in turn passes out of register with these fuel inlet ports the explosive mixture confined therein is compressed by the drawing together of the rims of the two rotors until, at the top of the engine where compression is maximum, the compressed charge is brought into communication with the ignition chambers, through the openings and grooves, and is exploded; and, as the first fuel charge is fired, the ignition chambers which are made wider than that part of the plates of the outer rotor between an opening 63 and the opening in the adjacent disk, permit a flashback into the next explosion chamber, thus rendering the further use of the spark plugs unnecessary for the continued operation of the engine. Moreover, after the firing of the fuel charges has begun the running of the engine is effected, as usual, by the expansion of the fuel charge first compressed and then fired in the successive explosion chambers while the pressure in the pressure storage tank is restored to and maintained on a balance with the pressure of the expanding products of combustion in the explosion chambers at the point in their cycle where they come in register with the pressure inlet ports. The products of combustion are exhausted from the explosion chambers, after expanding therein to substantially atmospheric pressure, and the chambers are both cooled and scavenged, by air which, throughout the operation of the engine, is drawn in from the outside to the interior of the inner rotor through the central air inlets 7 in the heads of the casing and is thence forced outwardly through the passages 70 in the vanes into the crescent-shaped space formed between the rim of the outer rotor and the casing where it is further compressed or forced onward by the projecting outer ends of the vanes and is forced under compression to the bottom of the engine through opening 13 into the air-chamber 12 in the front casing head and through opening 14 into and through the explosion chambers as they come successively into register therewith and out through the opening 15 into the exhaust chamber having an outlet 16, leaving each explosion chamber after passing the exhaust filled with fresh heated air. Furthermore during the entire operation of the engine, oil from the lubricant tank is forced under pressure from the pressure tank through the front and rear inlet ports into the races of the roller-bearings of the rotors and thence into the radial and circumferential grooves in the plates of the outer rotor, where it forms an oil packing and between the plates of the inner and outer rotors and into the bearings of the vanes, thus keeping the engine thoroughly lubricated without the use of the usual extraneous oil pump.

Having explained the principle of my invention and illustrated and described what I now consider to be the best form of engine in which to embody that principle, what I claim as new, and desire to secure broadly by Letters Patent, is—

1. An internal combustion engine comprising two rotors mounted to rotate together one within and eccentric to the other by means of disks turning in bearings in the sides of the outer rotor upon studs set in the rim of the inner rotor and radial vanes hinged in the rim of one and sliding in bearings in the rim of the other rotor, forming a series of expanding and contracting chambers.

2. An internal combustion engine comprising two rotors mounted to rotate together one within and eccentric to the other and a series of radial vanes hinged in the rim of one and sliding in bearings in the rim of the other rotor, forming a series of expanding and contracting chambers, means for supplying fuel to said chambers successively at a point to one side of a plane through the axes of the two rotors, means for firing the fuel charge within the chambers at a point substantially in said plane adjacent the axis of the inner rotor, and means for exhausting the products of combustion from the chambers at a point substantially in said plane adjacent the axis of the outer rotor.

3. An internal combustion engine comprising two rotors mounted to rotate together one within and eccentric to the other and radial vanes hinged in the rim of one and sliding in bearings in the rim of the other rotor, forming a series of expanding and contracting chambers, means for supplying fuel to the chambers at a point either on one or the other side of a plane passing through the axes of the two rotors, means for firing the charges within the chambers at a point substantially in said plane adjacent the axis of the inner rotor, and an exhaust outlet connecting with the chambers at a point substantially in said plane adjacent the axis of the outer rotor.

4. An internal combustion engine comprising two rotors mounted to rotate together one within and eccentric to the other and radial vanes hinged in the rim of one and sliding in the rim of the other rotor, forming a series of expanding and contracting chambers, means for admitting fuel to the said chambers on one side of a plane passing through the axes of the two rotors, means for firing the fuel charges in the chambers at a point substantially in said plane adjacent the axis of the inner rotor, passages adapted to connect each chamber when at said firing point with the next succeeding chamber, and means for exhausting the chambers at a point substantially in said plane adjacent the axis of the outer rotor.

5. An internal combustion engine comprising two rotors mounted to rotate together one within and eccentric to the other and radial vanes hinged in the rim of one and sliding in bearings in the other rotor, forming a series of expanding and contracting chambers, means for supplying fuel to the chambers at a point either on one or on the other side of a plane passing through the axes of the two rotors, means for firing the fuel charge within the chambers at a point substantially in said plane adjacent the axes of the inner rotor, passages connecting each chamber when at said firing point with the next succeeding chamber on either side, and means for exhausting the chambers at a point substantially in said plane adjacent the axis of the outer rotor.

6. An internal combustion engine comprising two rotors mounted to rotate together one within and eccentric to the other and radial vanes with passages extending from end to end hinged in the rim of one and sliding in bearings in the rim of the other rotor, forming a series of expanding and contracting chambers, and connections between a source of cooling medium and the inner ends of the passages through the vanes.

7. An internal combustion engine comprising two rotors mounted to rotate together one within and eccentric to the other and radial vanes having passages extending from end to end and hinged in the rim of one and sliding in bearings in the rim of the other rotor, forming a series of expanding and contracting chambers, an exhaust port with which each chamber is in communication at a given point in its revolution, and connections connecting the inner ends of the passages through the vanes with the air outside the rotors and the outer ends of the passages through the vanes with the exhaust through the chambers in succession.

8. An internal combustion engine comprising two rotors mounted to rotate together one within and eccentric to the other and radial vanes hinged in the rim of one and sliding in bearings in the rim of the other rotor, forming a series of expanding and contracting chambers, means for supplying an inert gas under pressure to the chambers at a point on one side of a plane passing through the axes of the two rotors at which the area of the chambers is relatively small, means for supplying fuel to the chambers at a point on the opposite side of said plane at which the area of the chambers is relatively large, means for firing the fuel charges within the chambers at a point substantially in said plane where the area of the chambers is approximately minimum, and means for exhausting the products of combustion from the chambers at a point substantially in said plane where the area of the chambers is approximately maximum.

9. An internal combustion engine comprising two rotors mounted to rotate together one within and eccentric to the other and radial vanes hinged in the rim of one and sliding in bearings in the rim of the other rotor, forming a series of expanding and contracting chambers, means for supplying compressed air to the chambers at a point either on one side or the other of a plane passing through the axes of the two rotors where the area of the chambers is relatively small, means for supplying fuel under pressure of the compressed air to the chambers at a point on the side of said plane opposite that side on which the compressed air is supplied where the area of the chambers is relatively large, means for firing the fuel charges within the chambers at a point substantially in said plane adjacent the axis of the inner rotor, and means for exhausting the products of combustion from the chambers at a point substantially in said plane adjacent the axis of the outer rotor.

10. An internal combustion engine comprising two rotors mounted to rotate together one within and eccentric to the other and radial vanes hinged in the rim of one and sliding in bearings in the rim of the other rotor, forming a series of expanding and contracting chambers, means for supplying compressed air to the chambers both from the front and from the back of the engine at a point either on one side or the other of a plane passing through the axes of the two rotors where the area of the chambers is relatively small, means for supplying fuel under pressure of the compressed air to the chambers both from the back and from the front of the engine on the side of the plane opposite that side on which the compressed air is supplied where the area of the chambers is relatively large, means for firing the fuel charges within the chambers at a point substantially in said plane adjacent the axis of the inner rotor, and means for exhausting the products of combustion from the chambers at a point substantially in said plane adjacent the axis of the outer rotor.

11. An internal combustion engine comprising a casing, two rotors mounted therein to rotate together one within the other the inner rotor about an axis substantially concentric with the casing and the outer rotor about an axis eccentric both to the inner rotor and to the casing and radial vanes provided with passages extending from end to end hinged in the rim of one and sliding in bearings in the rim of the other rotor, forming a series of expanding and contracting chambers, means for supplying air to the chambers at a point either on one side or the other of a plane passing through the axes of the two rotors where the area of the chambers is relatively small, means for supplying fuel under pressure of the compressed air to the chambers at a point on the side of said plane opposite that side on which the compressed air is supplied where the area of the chambers is relatively large, means for firing the fuel charges within the chambers at a point substantially in said plane adjacent the axis of the inner rotor, means for exhausting the products of combustion from the chambers at a point substantially in said plane adjacent the axis of the outer rotor, and means for connecting the inner ends of the passages in the vanes with the air outside the engine and the outer ends of said passages with the chambers at the point of exhaust.

12. The combination in a rotary gas engine comprising a series of expanding and contracting chambers separated by radial walls of a cooling system comprising as elements thereof passages extending through said walls from the inner to the outer ends thereof.

13. The combination in a rotary gas engine of a casing, two rotors mounted therein to rotate together one within and eccentric to the other, and a series of vanes hinged in one and sliding through packing bearings in the other rotor and having longitudinal passages connecting at one of their two ends with a cooling medium and at the other end with the interior of the casing outside the outer rotor.

14. The combination in a rotary gas engine of a casing, two rotors mounted therein to rotate together one within the other and one approximately concentric with and the other eccentric to the casing, and a series of radially disposed vanes hinged to one and sliding in bearings in the other rotor and having longitudinal passages connected at their inner ends with the air outside the casing and at their outer ends with the exhaust of the engine through the chambers formed by the vanes between the rims of the two rotors.

15. The combination in a rotary gas engine comprising a series of expanding and contracting chambers of means for supplying compressed air to the successive chambers at a point on one side of the engine to start the engine, means for supplying fuel under pressure of the compressed air to the successive chambers at a point on the opposite side of the engine, means for firing the fuel charge enclosed within the chambers at a point in the cycle where their area is substantially at a minimum, and means for producing a back firing from the fuel charge fired at such point into the next succeeding chamber.

16. The combination in a rotary gas engine comprising a series of expanding and contracting chambers of means for supplying an inert gas under pressure to the chambers on one side of the engine at a point in the cycle where their area is close to a minimum, and means both for supplying fuel to the chambers on the opposite side of the engine at a point in the cycle where their area is close to a maximum and for firing the fuel charge in said chambers at a point where their area is substantially at a minimum.

17. The combination in a rotary gas engine comprising a series of expanding and contracting chambers of means for supplying an inert gas under pressure to the chambers on either side of the engine at a point in the cycle where their area is close to a maximum, means for supplying fuel under pressure from said gas to the chambers on the side of the engine opposite that to which said gas is supplied at a point in the cycle where their area is close to a maximum, and means for firing the fuel in said chambers at a point in the cvycle where their area is substantially at a minimum.

18. The combination in a rotary gas engine comprising a series of expanding and contracting chambers of means for supplying an inert gas under pressure to the engine, means for utilizing the expanded products of combustion in the engine to maintain the pressure of said inert gas.

19. The combination in a rotary gas engine comprising a series of expanding and contracting chambers of means for supplying an inert gas under pressure to the engine, means for supplying both lubricant and fuel to the engine under pressure from said inert gas, and means for automatically restoring and maintaining the pressure of said inert gas during the operation of the engine.

20. The combination in a rotary gas engine comprising a series of expanding and contracting chambers of means for supplying an inert gas under pressure to the engine to start the same, means for supplying both lubricant and fuel to the engine under pressure from said inert gas, and means for maintaining the pressure of said inert gas at a parity with the pressure of the expanding products of fuel combination in the chambers at a point in the cycle of the engine at which the gas is supplied thereto.

21. In an internal combustion engine, the combination with a series of rotary expanding and contracting chambers of a source of supply of a compressed inert gas connected with the chambers successively at a point in the cycle where the area of each is near the minimum and of a source of fuel supply connected with the chambers successively at a point in the cycle where the area of each is near the maximum and of means for firing the fuel charge in the chambers successively at a point in the chambers successively at a point in the cycle where the area of each is at substantially the minimum.

22. In an internal combustion engine, the combination with a series of rotary expanding and contracting chambers of a pressure tank, a fuel tank, and connections from the pressure tank both to the fuel tank and to the chambers successively at a point in the cycle where the area of each is close to a minimum and from the fuel tank to the chambers successively at a point in the cycle where the area of each is close to a maximum.

23. In an internal combustion engine, the combination with a series of rotary expanding and contracting chambers of a pressure tank, a fuel tank, connections from the pressure tank both to the fuel tank and to the chambers on opposite sides of the engine at points in the cycle where the area is close to a minimum and from the fuel tank also to chambers on both sides of the engine at a point in the cycle where their area is close to a maximum, and means for controlling said connections to start and run the engine in either direction.

24. In an internal combustion engine, the combination with a series of rotary expanding and contracting chambers, of a pressure tank, a fuel tank, and connections from the pressure tank to the fuel tank and to the chambers on opposite side of the engine at points in the cycle where their area is close to a minimum and from the fuel tank to chambers on opposite sides of the engine at points in the cycle where their area is close to a maximum, said connections being through a control valve adapted to simultaneously open the connection between the pressure tank and either side of the engine and between the fuel tank and the other side of the engine.

25. The combination in a rotary gas engine comprising a series of expanding and contracting chambers and suitable firing and exhaust means of a pressure tank adapted to contain a supply of a suitable gas under compression, a fuel tank, and suitably controlled connections from the pressure tank both to the fuel tank and to the successive chambers at a point on one side of the engine and from the fuel tank to the successive chambers at a point on the opposite side of the engine.

26. The combination in a rotary gas engine comprising a series of expanding and contracting chambers of a pressure tank adapted to contain a supply of a suitable gas under compression, a fuel tank, connections from the pressure tank both to the fuel tank and to the successive chambers at points on both sides of the engine and from the fuel tank to the successive chambers at points on both sides of the engine, and control means adapted to open the connections from the pressure tank to the fuel tank and to the chambers on either one of the two sides of the engine and from the fuel tank to the chambers on the opposite side of the engine.

27. The combination in a rotary gas engine comprising a series of expanding and contracting chambers of a pressure tank adapted to contain a supply of a suitable gas under compression, a fuel tank, connections from the pressure tank both to the fuel tank and to the successive chambers at points on both sides of the engine, and a single control valve adapted to simultaneously open the connection between the two tanks and the connections between one tank and the chambers on one side and between the other tank and the chambers on the opposite side of the engine.

28. The combination in a rotary gas engine comprising a series of expanding and contracting chambers of a pressure tank adapted to contain a supply of a suitable gas under compression, a fuel tank, a lubricant tank, connections from the pressure tank to both fuel and lubricant tanks and to the chambers at points on both sides of the engine and from the lubricant tank to the engine and from the fuel tank to the chambers at points on both sides of the engine, and control means for opening said connections from the pressure tank to the fuel and lubricant tanks and from the pressure tank to the chambers on either one of the two sides of the engine and from the fuel tank to the chambers on the opposite sides of the engine.

29. The combination in a rotary gas engine comprising a series of expanding and contracting chambers of a pressure tank adapted to contain a supply of a suitable gas, a fuel tank, a lubricant tank, connections from the pressure tank to both fuel and lubricant tanks and to the front and rear of the chambers at points on both sides of the engine and from the lubricant tank to the front and rear of the engine and from the fuel tank to the front and rear of the chambers at points on both sides of the engine, and control means for opening said connections from the pressure tank to the fuel and lubricant tanks and from the pressure tank to the chambers on either one of the two sides of the engine and from the fuel tank to the chambers on the opposite side of the engine.

30. A rotary engine including two rotors eccentrically mounted, overlapping ring portions carried by the respective rotors, vanes engaging the rotors and dividing the spaces between the ring portions of the rotors into a series of laterally expanding and contracting chambers, each vane including a tapered edge surface and a wedge shaped packing member having an angularly inclined portion slidably engaging said tapered surface and so arranged as to slide on said surface and expand the vane laterally under the influence of centrifugal force incident to rotation of the engine.

31. An internal combustion engine including two rotors eccentrically mounted, overlapping ring portions carried by the respective rotors, vanes engaging the rotors to divide the space between the rotors into a series of alternately expanding and contracting chambers, a projection carried by one rotor, means engaged by the projection and carried by and movable with respect to the other rotor to synchronize the rotation of the rotors.

32. An internal combustion engine including two rotors, ring portions carried by the rotors in radial overlapping relation, generally radial vanes engaging the overlapping portions of the two rotors so as to divide the space between the rotors into a series of alternately expanding and contracting chambers as the rotors move on their respective axes, and means synchronizing the rotors to rotate together comprising a pin projecting laterally of one rotor, and means carried by and rotatable with respect to the other rotor and engaged by the pin so that a driving relation is established during a complete revolution of one rotor.

33. An internal combustion engine including two rotors eccentrically mounted, each rotor including a ring portion, the ring portions overlapping radially of the axes of the rotors, generally radial vanes engaging the overlapping portions so as to divide the space between the rotors into a series of alternately expanding and contracting chambers, each vane arranged to expand under the influence of centrifugal force for sealing said chambers upon rotation of the rotors.

34. An internal combustion engine comprising two eccentrically mounted rotors, overlapping ring portions carried by the respective rotors, generally radial vanes engaging the overlapping ring portions to divide the space between the overlapping portions into a series of alternately expanding and contracting chambers, each vane comprised of a plurality of pieces and having a passage substantially from end to end communicating with the interior of one ring portion, means for conducting a cooling medium to said interior of the ring portion, the arrangement being such that rotation of the rotors causes centrifugal force to simultaneously expand said vanes to effect a packing seal and forces said cooling medium to pass longitudinally through said vanes to impel the cooling medium through said conducting means.

35. A rotary internal combustion engine, including eccentric rotors and slidable vanes comprising a series of alternately expanded and contracting chambers, means for exhausting burnt gases from the chambers and scavenging with fresh air at a point substantially near the plane passing through the axes of the rotors where the chambers approximate maximum expansion, means for injecting fuel into the chambers serially between the point of scavenging and point of maximum contraction, means for firing the charges in the chambers serially at approximately their point of maximum contraction, and means for utilizing the chamber pressures at a point of higher pressure than the point of fuel injection for effecting the fuel injection.

In witness whereof, I, the said HERBERT A. BULLARD, have hereunto set my hand at Philadelphia, county of Philadelphia, and State of Pennsylvania, this 20th day of February, 1929.

HERBERT A. BULLARD